United States Patent [19]
Manaka et al.

[11] Patent Number: 4,919,096
[45] Date of Patent: Apr. 24, 1990

[54] ELECTRONIC THROTTLE CONTROLLING APPARATUS FOR USE IN AN INTERNAL COMBUSTION ENGINE

[75] Inventors: Toshio Manaka, Katsuta; Masami Shida, Mito, both of Japan

[73] Assignee: Hitachi, Ltd., Tokyo, Japan

[21] Appl. No.: 288,125

[22] Filed: Dec. 22, 1988

[30] Foreign Application Priority Data

Dec. 28, 1987 [JP] Japan .............................. 62-330240

[51] Int. Cl.$^5$ ........................ F02D 7/00; F02D 41/00
[52] U.S. Cl. .................................... 123/399; 123/361; 123/340
[58] Field of Search ................ 123/399, 361, 340, 352

[56] References Cited

U.S. PATENT DOCUMENTS

| | | | |
|---|---|---|---|
| 4,506,642 | 3/1985 | Pfalzgraf et al. | 123/361 |
| 4,735,183 | 4/1988 | Inoue et al. | 123/399 |
| 4,781,162 | 11/1988 | Ishikawa et al. | 123/399 |
| 4,787,353 | 11/1988 | Ishikawa et al. | 123/399 |
| 4,799,467 | 1/1989 | Ishikawa et al. | 123/399 |
| 4,811,712 | 3/1989 | Itow | 123/399 |
| 4,811,713 | 3/1989 | Shimada et al. | 123/399 |

*Primary Examiner*—Raymond A. Nelli
*Attorney, Agent, or Firm*—Antonelli, Terry & Wands

[57] ABSTRACT

A control unit outputs a data through an execution of each frequency of an engine driving operation condition such as an operation amount of an accelerator pedal, an engine speed, and a gear position. Frequency distribution of the engine driving condition is made through an addition processing and a subtraction processing in an area division. The present target throttle opening degree is determined through an area division judgment in the control unit. An actual throttle opening degree is adjusted so as to become a target throttle opening degree. The target throttle opening degree is searched through a map for searching the target throttle opening degree. The obtained engine control conditions are stored and memorized successively in the control unit, and an engine control characteristic is selected in sequence according to the memorized results. An operation characteristic corresponding to the driver's driving operation is selected and an optimum operability performance is obtained.

14 Claims, 4 Drawing Sheets

ELECTRONIC THROTTLE CONTROLLING APPARATUS FOR USE IN AN INTERNAL COMBUSTION ENGINE

BACKGROUND OF THE INVENTION

The present invention relates to an electronic throttle controlling apparatus for use in an internal combustion engine and, more particularly, to an electronic throttle controlling apparatus in which the amount of intake air flow is controlled indirectly through the actuator without direct control through an accelerator pedal.

The present invention relates to an electronic throttle controlling apparatus for use in an internal combustion engine suitable for use in an automobile in which a demand for improving the operability of the vehicle is an important requirement.

Recently, in an internal combustion engine, such as a gasoline internal combustion engine for use in an automobile, from the aspect of improving engine control, in place, in replace of a throttle controlling method in which a throttle valve is operated directly from an accelerator pedal, various kinds of engine controlling systems for utilizing an electronic throttle controlling method have been proposed.

In such an electronic throttle controlling method, an intake air flow amount controlling apparatus, such as a throttle valve, is controlled indirectly through an actuator which operates in response to an electric signal.

A conventional electronic throttle controlling apparatus for use in an internal combustion engine is disclosed in, for example, Japanese Patent Publication No. 33090/1987, in which a throttle valve opening degree is controlled by using a minimum fuel consumption amount as a target.

In the above stated conventional electronic throttle controlling apparatus, for maintaining the minimum fuel consumption amount, an engine output and an engine speed are controlled so as to vary along a minimum fuel consumption curve. A detector or a function generator has an execution function, thereby an engine output command signal and an engine speed command signal are varied periodically along the minimum fuel consumption curve.

Recently, it has been found that there are a variety of demands for running performance in an automobile, and further various different operabilities for the vehicle are desired. However, no consideration is given to the selection of such a desired operability for the vehicle; accordingly, there has been a problem that no optional driving feeling with the vehicle is given fully suitable for driver's choice.

SUMMARY OF THE INVENTION

An object of the present invention is to provide an electronic throttle controlling apparatus for use in an internal combustion engine wherein a predetermined operability suitable to the driver can be obtained automatically.

Another object of the present invention is to provide an electronic throttle controlling apparatus for use in an internal combustion engine wherein the engine torque characteristic can be controlled in response to the amount of accelerator operation and in accordance with a tendency of the driver's manner of operation.

A further object of the present invention is to provide an electronic throttle controlling apparatus for use in an internal combustion engine wherein an optimum driving feeling for the vehicle can be obtained at all times.

In accordance with the present invention, an electronic throttle controlling apparatus for use in internal combustion engine has a detector for detecting the extent of actuation of an accelerator pedal and the engine speed. In this apparatus an actuator provided for controlling intake air flow amount of the engine is controlled in accordance with an output signal of the detector, and a memory is provided for storing in sequence driving operation conditions of the engine.

A plurality of predetermined control characteristics of the actuator are obtained according to the output signal of the detector, and one of the plurality of predetermined control characteristics of the actuator is selected according to data in the memory.

The driving operation condition of the engine includes at least one of (1) the extent of operation of the accelerator pedal, (2) the operation speed of the accelerator pedal including the frequency of movement of the accelerator and the change in speed of the accelerator operation and the like, (3) the conversion operation frequency of the reduction ratio of the power transmission system including the frequency of the gear position or the like, (4) the change rate of the engine speed, (5) the change rate of the engine load, and (6) the change rate of the vehicle speed.

In accordance with the present invention, various engine control conditions being given to the engine through the driver are stored successively, and an engine control characteristic with an intake air flow amount for the engine is selected in sequence according to the stored results.

A control operation condition for the engine through the driver is left as a history, and then an intake air flow amount control characteristic for the engine is selected according to this history. Therefore, since an operation characteristic corresponding to the driver's driving operation is selected, even with a change of driver, an optimum operability performance can be obtained at all times.

According to the present invention, the engine torque characteristic can be changed with the accelerator operation amount in accordance with the tendency of the driving operation through the driver, therefore the optimum driving feeling for the vehicle can be obtained at all times.

DESCRIPTION OF THE INVENTION

Figure 1:
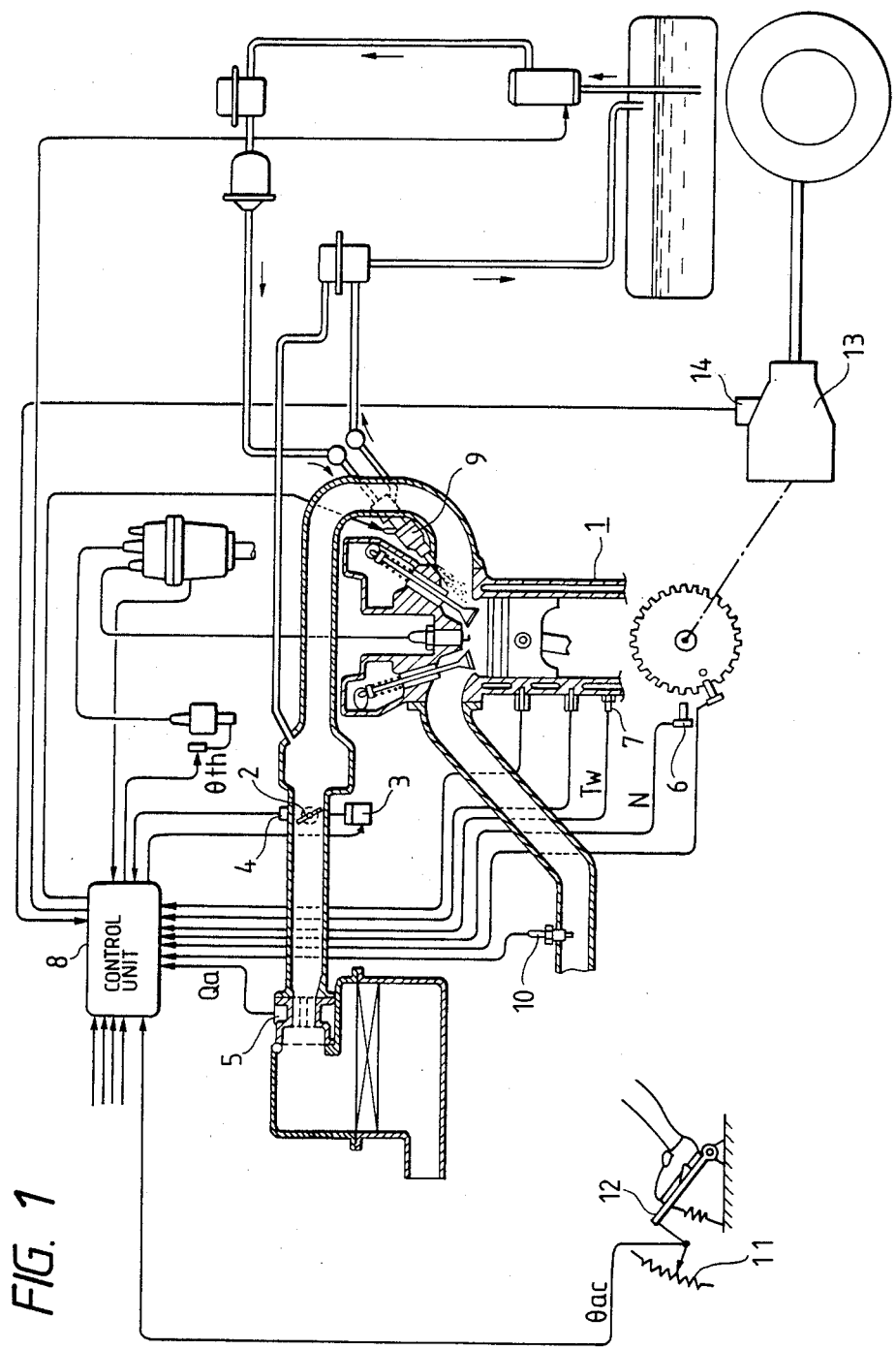
FIG. 1 is a diagrammatic view showing a gasoline internal combustion engine in which one embodiment of an electronic throttle controlling apparatus according to the present invention is adopted.

One embodiment of an electronic throttle controlling apparatus for use in an internal combustion engine according to the present invention will be explained below in detail referring to the drawings.

FIG. 1 is a diagram showing an example of a fuel injection system for a gasoline internal combustion engine in which one embodiment of an electronic throttle controlling apparatus according to the present invention is adopted.

The intake air flow amount in the gasoline internal combustion engine 1 is controlled in accordance with the opening degree of a throttle valve 2. The throttle valve 2 is opened and closed by driving a motor 3 and the actual opening degree $\theta_{th}$ of the throttle valve 2 is detected by a throttle opening degree detecting sensor 4.

Besides, an actual intake air flow amount $Q_a$ of the engine 1 is detected by an air flow amount detecting sensor 5. The speed (number of revolutions) N of the engine 1 is detected by an engine speed detecting sensor 6 and the coolant temperature $T_w$ of the engine 1 is detected by a coolant temperature detecting sensor 7.

A control unit 8 functions mainly to provide engine control for the engine 1 and has a microprocessor therein as a main control component. The control unit 8 takes in various kinds of signals representative of the actual intake air flow amount $Q_a$, the engine speed N, and the engine coolant temperature $T_w$ or the like through the above stated various sensors and carries out a predetermined processing of this data to effect control over engine operation.

The control unit 8 calculates a fuel supply amount periodically and operates to apply a signal to an injector (fuel injection valve) 9 to inject a fuel supply amount corresponding to a result of the calculator. In parallel with this operation, the control unit 8 receives a signal from an oxygen amount detecting sensor ($O_2$ sensor) 10, and maintains a predetermined air fuel ratio control for the engine 1.

An accelerator operation amount detecting sensor 11 detects the extent of operation of an accelerator pedal 12 and supplies a signal representing accelerator operation amount $\theta_{ac}$ to the control unit 8. As a result, the control unit 8 responds to the signal amount $\theta_{ac}$ and carries out a predetermined execution processing in accordance with this signal and with the above stated engine speed signal N.

At this time, the control unit 8 calculates also an opening degree for the throttle valve 2 (a target throttle opening degree $\theta_{thref}$) and supplies the obtained target throttle opening degree $\theta_{thref}$ to the motor 3, which works as an actuator for operating the throttle valve 2, so as to produce a predetermined throttle opening degree. A measure of the actual throttle opening degree $\theta_{th}$ at this time is supplied by the throttle opening degree detecting sensor 4 and thereby a feedback control for converging the target throttle opening degree $\theta_{thref}$ is obtained.

A gear position detecting sensor 14 is provided on a transmission 13 which is mounted on the automobile.

According to this embodiment of the present invention, a predetermined air fuel ratio control for the engine 1 is maintained through the control unit 8 and, in company with this air fuel ratio control, control of the opening degree of the throttle valve 2 is provided by the actuator, such as motor 3 or the like in accordance with the accelerator operation amount signal $\theta_{ac}$ of the accelerator pedal 12. Namely, engine control utilizing an electronic throttle controlling method is employed in the practice of the present invention.

Next, an example of the electronic throttle controlling apparatus of the present invention will be explained.

In the embodiment of the present invention shown in FIG. 1, the calculation processing for determining the opening degree of the throttle valve 2 performed by the control unit 8 is provided by a map retrieval or map reference on the basis of the accelerator operation amount $\theta_{ac}$ and the engine speed N.

Figure 2:
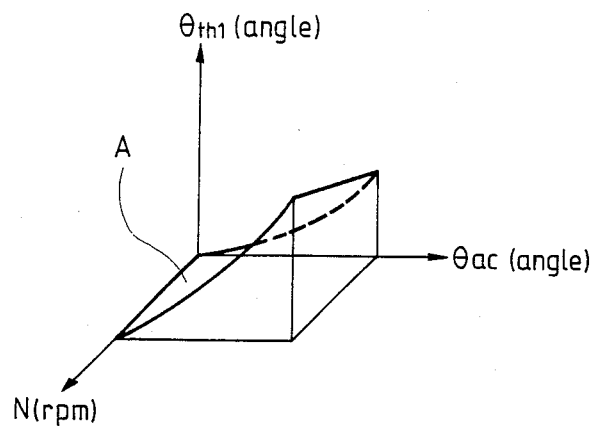
FIG. 2 is an explanatory view showing a map for searching one target throttle opening degree in which a gentle operability is given.
Figure 3:
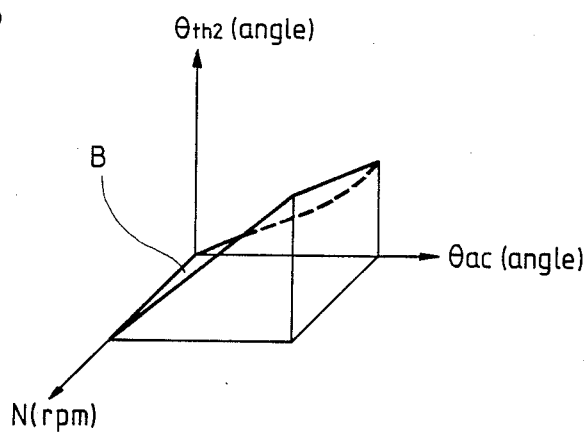
FIG. 3 is an explanatory view showing a map searching for another target throttle opening degree in which a quick operability is given.

At this time, two kinds of maps A and B for searching the target throttle opening degree $\theta_{thref}$ are used, as shown in FIG. 2 and FIG. 3. Two kinds of the output data comprising a first throttle opening degree $\theta_{th1}$, and a second throttle opening degree $\theta_{th2}$ are obtained simultaneously in response to the same input data for engine speed N and accelerator operation amount $\theta_{ac}$. One of two kinds of the output data comprising a first throttle opening degree $\theta_{th1}$ and a second throttle opening degree $\theta_{th2}$ is then selected in accordance with a predetermined condition.

In these target throttle opening degree searching maps A and B, as shown in FIG. 2 and FIG. 3, for example the map A shown in FIG. 2 is used so as to provide a gentle response characteristic and the map B shown in FIG. 3 is used so as to provide a quick response characteristic for control of the vehicle or an operability suitable for a heavy load condition of the vehicle.

Figure 4:
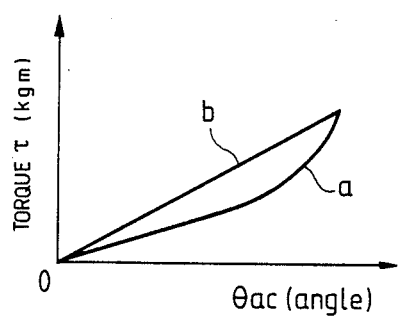
FIG. 4 is an explanatory view showing two kinds of engine torque characteristics.

A torque $\tau$ characteristic of the engine 1 for different values of accelerator operation amount $\theta_{ac}$ is shown in FIG. 4. In FIG. 4, an engine torque characteristic a is formed in accordance with the target throttle opening degree searching map A and an engine torque characteristic b is formed in accordance with the target throttle opening degree searching map B, respectively.

According to the difference in the engine torque $\tau$ characteristic, such as the engine torque characteristic a or the engine torque characteristic b shown in FIG. 4, since an inclination in an increase of the engine torque $\tau$ against the accelerator operation amount $\theta_{ac}$ differs, the vehicle can be accelerated gently or accelerated quickly for the same accelerator operation amount $\theta_{ac}$ depending on the engine torque characteristic employed.

Figure 5:
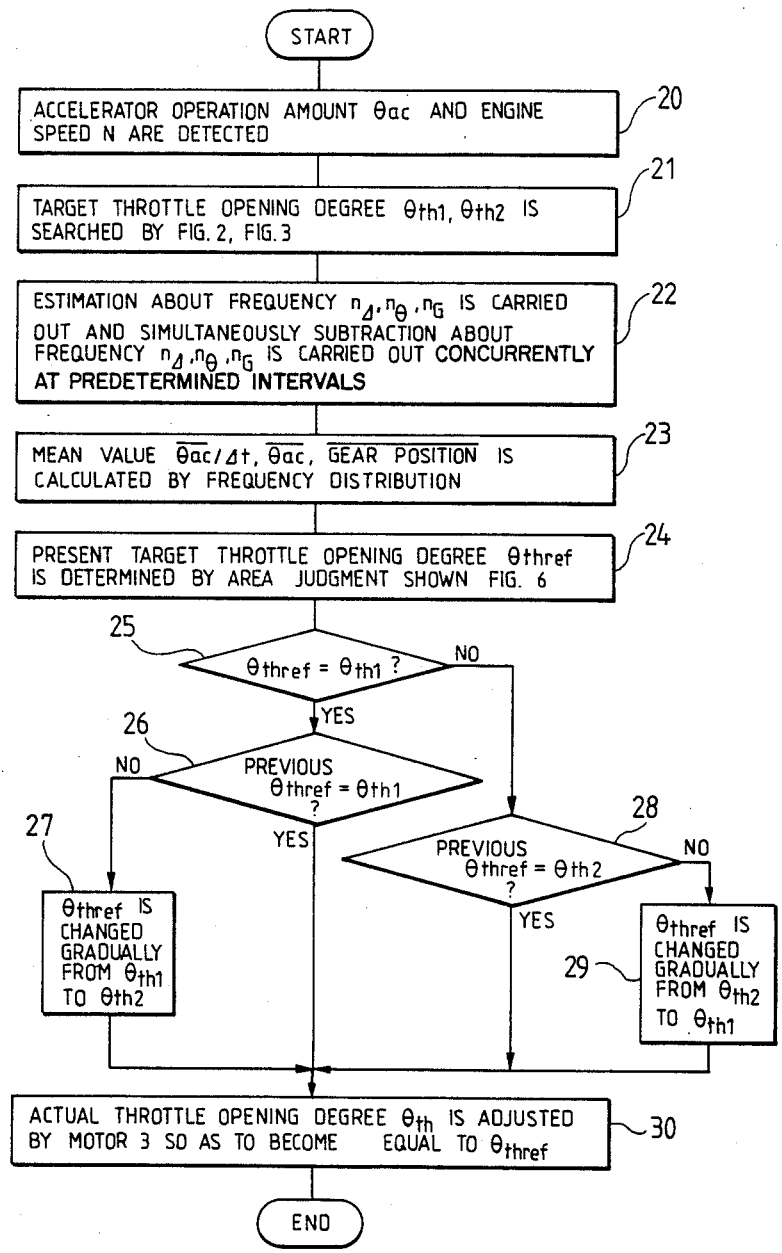
FIG. 5 is a flow-chart for a control processing by a control unit.

FIG. 5 is a flow-chart in which a control processing is executed through the control unit 8. The features of the present invention will be explained below with reference to this flow-chart. The control processing by the control unit 8 shown in FIG. 5 is activated with a predetermined period.

When this control processing by the control unit 8 is activated, first of all at a step 20, the accelerator operation amount $\theta_{ac}$ and the engine speed N of the engine 1 are detected by the accelerator operation amount detecting sensor 11 and the engine speed detecting sensor 6, respectively. Next at a step 21, values of the first throttle opening degree $\theta_{th1}$ and the second throttle opening degree $\theta_{th2}$ of the throttle valve 2 are referred to in the maps A and B in accordance with the accelerator operation amount $\theta_{ac}$ and the engine speed N, respectively.

At a step 22 so as to establish an up-to-date driving method, an additional consideration of a frequency ($n_\Delta$) of use of a rate of change of the accelerator operation amount $\theta_{ac}$, a frequency ($n_\theta$) of use of the accelerator operation amount $\theta_{ac}$, and a frequency ($n_G$) of use of a gear position is carried out, respectively. For purposes of determining the frequency ($n_G$) of use of the gear position, a gear position detecting sensor 14 is provided at the transmission 13 of the vehicle as shown in FIG. 1.

Figure 7:
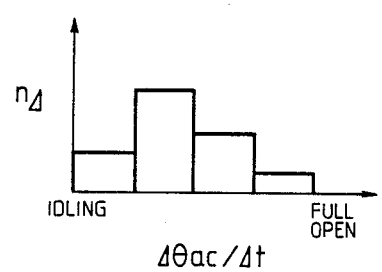
FIG. 7 is a graph showing a change speed frequency distribution of an accelerator operation amount.
Figure 8:
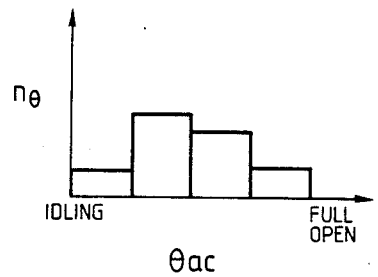
FIG. 8 is a graph showing a frequency distribution of an accelerator operation amount.
Figure 9:
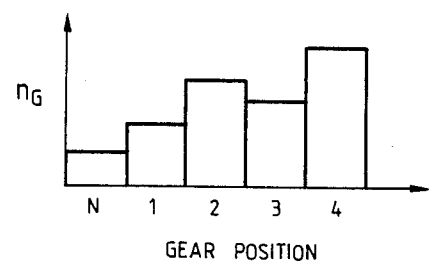
FIG. 9 is a graph showing a frequency distribution of a gear position.

One example of each of the frequency distribution ($n_\Delta$) of the rate of change of use of the accelerator operation amount $\theta_{ac}$, the frequency distribution ($n_\theta$) of use of the accelerator operation amount $\theta_{ac}$, and the frequency distribution ($n_G$) of use of a gear position is shown in FIGS. 7, 8 and 9, respectively.

In FIGS. 7 and 8, each of the frequency distribution ($n_\Delta$) of the rate of change of the accelerator operation amount $\theta_{ac}$ and the frequency distribution ($n_\theta$) of use of the accelerator operation amount $\theta_{ac}$ is shown in four stages in a range from an idling state to a throttle full open state.

In FIG. 9, the frequency distribution ($n_G$) of use of the gear position of the transmission is shown for five gear positions in a range from a neutral position to a fourth gear position.

However, in order to record each up-to-date frequency for the rate of frequency ($n_\Delta$) of the change of the accelerator operation amount $\theta_{ac}$, the frequency ($n_\theta$) of use of the accelerator operation amount $\theta_{ac}$, and the frequency ($n_G$) of use of the gear position a subtraction control operation for each frequency is practised simultaneously at periodic intervals. By this subtraction control operation, old frequency data for each frequency is reduced by a unit amount and the frequency data becomes zero when new frequency addition is not practised.

At a step 23, each average value or mean value of the frequencies is calculated in accordance with each of the frequency distributions in the step 22.

Figure 6:
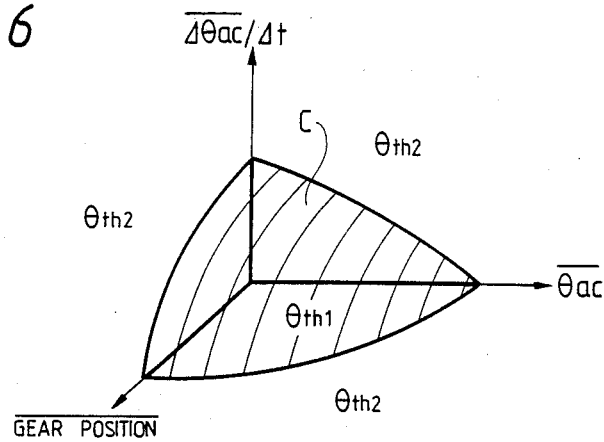
FIG. 6 is an explanatory view showing an area division characteristic for a throttle opening degree control.

At a step 24, a target throttle opening degree $\theta_{thref}$ of the throttle valve 2 is determined for an area division characteristic for a throttle opening degree control shown in FIG. 6.

FIG. 6 is a characteristic view of the area division of the target throttle opening degree $\theta_{thref}$. In FIG. 6, the area division of the target throttle opening degree $\theta_{thref}$ is divided into values inside or outside of a curved surface C according to an average frequency of the rate of change of the accelerator operation amount $\overline{\theta_{ac}/\Delta t}$, an average frequency of use of the accelerator operation amount $\overline{\theta_{ac}}$, and an average frequency of use of the gear position gear position.

When the value of the target throttle opening degree $\theta_{thref}$ is inside of the curved surface C, the throttle opening degree is controlled by the output data in the area division of the first throttle opening degree $\theta_{th1}$. When the value of the target throttle opening degree $\theta_{thref}$ is outside of the curved surface C, the throttle opening degree is controlled by the output data in the area division of the second throttle opening degree $\theta_{th2}$.

At a step 25, a search is conducted to determine whether or not the present target throttle opening degree $\theta_{thref}$ corresponds to the first throttle opening degree $\theta_{th1}$, and when the result is judged YES, the control processing in the control unit 8 goes to a step 26.

When the previous target throttle opening degree data $\theta_{thref}$ is not the first throttle opening degree $\theta_{th1}$, at a step 27, the target throttle opening degree data $\theta_{thref}$ is changed gradually from the second throttle opening degree $\theta_{th2}$ to the first throttle opening degree $\theta_{th1}$.

Besides, when the target throttle opening degree data $\theta_{thref}$ which is determined at the step 24 is not the first throttle opening degree $\theta_{th1}$, namely the target throttle opening degree data $\theta_{thref}$ corresponds to the second throttle opening degree $\theta_{th2}$, at a step 28, it is judged whether or not the previous target throttle opening degree data $\theta_{thref}$ is the second throttle opening degree $\theta_{th2}$.

When the previous target throttle opening degree data $\theta_{thref}$ is not the second throttle opening degree data $\theta_{th2}$, at a step 29, the target throttle opening degree data $\theta_{thref}$ is changed gradually from the first throttle opening degree $\theta_{th1}$ to the second throttle opening degree $\theta_{th2}$.

Finally, at a step 30, the actual throttle opening degree $\theta_{th}$ is adjusted by the motor 3 so as to become equal to the target throttle opening degree $\theta_{thref}$ and then the control processing through the control unit 8 is finished.

In this case in order to detect the actual throttle opening degree $\theta_{th}$, in the above stated embodiment of the invention, the throttle opening degree detecting sensor 4 is used therein. However, a stepping motor is used as the motor 3, since the pulse number applied to the stepping motor corresponds one to one to the throttle opening degree. Therefore, the actual throttle opening degree $\theta_{th}$ can be realized from the applied pulse number to the stepping motor without the use of the throttle opening degree detecting sensor 4.

Therefore, according to this embodiment of the present invention, the data calculation, which indicates the tendency of the driving operation by the driver, is carried out in sequence by the control processing at the step 22. In accordance with this calculated data, the control condition of the actual throttle opening degree $\theta_{th}$ for the accelerator operation amount $\theta_{ac}$ is subject to selection, so that it is possible to automatically provide the operability suitable for the driver's choice.

In the above stated embodiment of the present invention, the accelerator operation and the speed change gear operation are used for an element for grasping objectively the driver's choice. However, if the driver's choice is reflected, it goes without saying that the driver's choice is judged in accordance with a certain kind of condition, for example a change rate of the engine speed, a change rate of the engine load, and a change rate of the vehicle speed or the like.

Further, in the above stated embodiment of the present invention, a motor is used as the actuator means for operating the throttle valve. However, in the present invention, another actuator means may be used, for example a negative pressure drive means by an electromagnetic valve control or the like.

According to the above stated embodiment of the present invention, the engine torque characteristic with the accelerator operation amount can be changed in accordance with the tendency of the driving operation by the driver, therefore the optimum driving feeling for the driver can be obtained at all times.

We claim:
1. In an electronic throttle controlling apparatus for use in an internal combustion engine of a motor vehicle having detect means for detecting an operation amount of an accelerator pedal and engine speed, and actuator means for controlling an intake air flow amount of the engine in accordance with a control signal, the improvement comprising memory means for storing data indicating a driving operation condition of the engine peculiar to the driving history of the motor vehicle and at least first and second maps each providing a different predetermined control characteristic of values of actuation of said actuator means according to values of operation amount of the accelerator pedal and engine speed provided by said detect means, and control means for generating said control signal for said actuator means on the basis of a value of actuation of said actuator means read from one of said maps selected on the basis of stored values of said driving operation condition of the engine.

2. An electronic throttle controlling apparatus for use in an internal combustion engine according to claim 1, characterized in that said stored data indicating a driving operation condition of the engine includes at least one of values of an operation amount of said accelerator pedal, values of an operation speed of said accelerator pedal, values of a conversion operation frequency of a reduction ratio of a power transmission system values of a change rate of engine speed, values of a change rate of engine load, and values of a change rate of vehicle speed.

3. An electronic throttle controlling apparatus for use in an internal combustion engine according to claim 1, characterized in that said memory means stores values of engine driving operation condition according to a frequency distribution of said value.

4. An electronic throttle controlling apparatus for use in an internal combustion engine according to claim 3, wherein said control means for determining said frequency distribution of values of the engine driving condition by an addition processing of a frequency in an area division of the engine driving operation condition and a subtraction processing of a frequency in an area division of the driving operation condition carried out at predetermined intervals of time.

5. In an electronic throttle controlling apparatus for use in an internal combustion engine of a motor vehicle having detect means for detecting an operation amount of an accelerator pedal and engine speed, and actuator means for controlling an intake air flow amount of the engine in accordance with a control signal, the improvement comprising memory means for storing data indicating a driving operation condition of the engine peculiar to the driver of the motor vehicle and a plurality of maps each providing a different predetermined control characteristic of values of actuation of said actuator means in accordance with values of operation amount of the accelerator pedal and engine speed provided by said detect means, said values of driving operation condition of the engine including values of an operation amount of said accelerator pedal, values of a change speed of said operation amount of said accelerator pedal, and values of a gear position, and control means for generating and storing in said memory means frequency distributions of values of said change speed of said operation amount of said accelerator pedal, of values of said operation amount of said accelerator pedal, and of values of said gear position, said control means including means for generating said control signal for said actuator means on the basis of a value of actuation of said actuator means read from one of said maps selected on the basis of stored values of said driving operation condition of the engine.

6. An electronic throttle controlling apparatus for use in an internal combustion engine according to claim 5, wherein said control means includes means for determining said frequency distributions of values of the engine driving operation condition by an addition processing of a frequency in an area division of the engine driving operation condition and a subtraction processing of a frequency in an area division of the engine driving operation condition carried out at predetermined intervals of time.

7. An electronic throttle controlling apparatus for use in an internal combustion engine according to claim 5, wherein said control means includes means for determining an average value of each said change speed frequency of said accelerator operation amount, said frequency of said accelerator operation amount, and said frequency of said gear position, a map being selected on the basis of at least one of said average values.

8. An electronic throttle controlling apparatus for use in an internal combustion engine according to claim 5, characterized in that said control signal represents a present target throttle opening degree corresponding to a value read from a map selected by an area division judgement performed by said control means based on stored values of said engine driving operation condition, and an actual throttle opening degree is adjusted to so as to equal said target throttle opening degree through said actuator means.

9. In an electronic throttle controlling apparatus for use in an internal combustion engine of a motor vehicle having detect means for detecting an operation amount of an accelerator pedal and engine speed, actuator means for controlling an intake air flow amount of the engine in accordance with a control signal and memory means for storing data, a method of controlling intake air flow amount by controlling said actuator means, comprising the steps of:

storing in said memory means a plurality of maps each providing a different predetermined control characteristic of values of target throttle opening degree according to values of operation amount of the accelerator pedal and engine speed provided by said detect means;

storing in said memory means values of a change speed frequency of said accelerator operation amount, a frequency of said accelerator operation amount, and a frequency of a gear position;

effecting a subtraction process for each of the values of said change speed frequency of said accelerator operation amount, said frequency of said accelerator operation amount, and said frequency of said gear position in said memory means;

calculating an average value of the respective values of said change speed frequency of said accelerator operation amount, values of said frequency of said accelerator operation amount, and values of said frequency of said gear position in said memory means for a predetermined frequency distribution thereof;

reading out of said memory means a value of present target throttle opening degree from a map selected by an area division of said average values;

comparing said present target throttle opening degree with an actual value of throttle opening degree to determine whether or not the throttle opening degree is equal to the value indicated by the read out target throttle opening degree; and adjusting an actual throttle opening degree so as to become equal to said value of present target throttle opening degree by control of said actuator means.

10. A method according to claim 9, wherein said subtraction process for each of the values of said change frequency of said accelerator operation amount, said frequency of said accelerator operation amount, and said frequency of said gear position is carried out in a predetermined frequency range of the driving operation condition at predetermined intervals of time.

11. A method according to claim 9, wherein said value target throttle opening degree is selected from a first target throttle opening degree and a second target throttle opening degree obtained from respective maps in said memory means.

12. A method according to claim 11, wherein said present target throttle opening degree is compared with a previous value of target throttle opening degree to determine whether or not the value of target throttle opening degree has changed, and when said value of target throttle opening degree has changed, said previous value of throttle opening degree is adjusted to approach said present target throttle opening degree.

13. A method according to claim 12, wherein when both said previous value of target throttle opening degree and said present value of target throttle opening degree are equal to said first target throttle opening degree, said actual throttle opening degree is adjusted to become equal to said first target throttle opening degree through said actuator means.

14. A method according to claim 12, wherein, when said previous value of target throttle opening degree is equal to said second target throttle opening degree and said present value of target throttle is equal to said first target throttle opening degree, said present target throttle opening degree is gradually changed from said second target throttle opening degree to said first target throttle opening degree at predetermined intervals of time.

* * * * *